US010797786B1

(12) United States Patent
Ai (10) Patent No.: US 10,797,786 B1
(45) Date of Patent: Oct. 6, 2020

(54) METHOD FOR PREDICTING SPOT BEAM HIGH THROUGHPUT SATELLITE SYSTEM PERFORMANCE

(71) Applicant: Liping Ai, San Diego, CA (US)

(72) Inventor: Liping Ai, San Diego, CA (US)

( * ) Notice: Subject to any disclaimer, the term of this patent is extended or adjusted under 35 U.S.C. 154(b) by 0 days.

(21) Appl. No.: 16/447,898

(22) Filed: Jun. 20, 2019

Related U.S. Application Data

(63) Continuation-in-part of application No. 15/694,167, filed on Oct. 27, 2017, now abandoned.

(60) Provisional application No. 62/420,869, filed on Nov. 11, 2016.

(51) Int. Cl.
*H04B 7/185* (2006.01)
*H04B 17/336* (2015.01)

(52) U.S. Cl.
CPC ....... *H04B 7/18519* (2013.01); *H04B 17/336* (2015.01)

(58) Field of Classification Search
CPC ................................................ H04B 7/18519
USPC ........................................................ 370/252
See application file for complete search history.

(56) References Cited

U.S. PATENT DOCUMENTS

| 6,246,874 B1* | 6/2001 | Voce .................. H04B 7/18541 455/13.1 |
| 2010/0054131 A1* | 3/2010 | del Rio Herrero .......... H04B 1/71072 370/236 |
| 2017/0041830 A1* | 2/2017 | Davis ................ H04W 36/0088 |
| 2017/0180038 A1* | 6/2017 | Oza ...................... H04B 7/2041 |

OTHER PUBLICATIONS

E. Lutz, M. Werner, and A.Jahn, <<Satellite Systems for Personal and Broadband Communications>> Springer Dec. 2012, ISBN-13: 978-3540668404 Appendix A: pp. 345-350.

* cited by examiner

*Primary Examiner* — Jason C Olson (57) ABSTRACT

Method for determining high-throughput-satellite (HTS) system user downlink signal-to-noise-plus-interference ratios (SNIRs) and SNIR distributions is provided, including a procedure for estimating parameters of one spot beam and that for multiple co-color spot beams, and the projection of the satellite antenna radiation patterns onto Earth to form the spot beam power spatial distributions that lead to the SNIRs and SNIR distributions of stationary or mobile user terminals (UTs) in clear sky (CS) line-of-sight (LOS) propagation channel conditions. The estimation precision is controllable. The method is implemented in a programming language run on computational hardware with built-in or connected user interface (UI) devices including desktops, laptops, severs or super-computers. It can be used alone or as part of a simulation package or part of a system operation management software of the control gateway (GW) in the HTS system for system downlink designs.

2 Claims, 6 Drawing Sheets

METHOD FOR PREDICTING SPOT BEAM HIGH THROUGHPUT SATELLITE SYSTEM PERFORMANCE

CROSS-REFERENCE TO RELATED APPLICATION

This application is a continuation-in-part of the U.S. Non-provisional application Ser. No. 15/694,167, titled "METHOD FOR PREDICTING SPOT BEAM HIGH THROUGHPUT SATELLITE SYSTEM PERFORMANCE" filed on Oct. 27, 2017 which claims the benefit of priority to U.S. Provisional Application No. 62/420,869, titled "HIGH THROUGHPUT SATELLITE SPOT BEAM DEPLOYMENT APPARATUS AND METHOD" filed on Nov. 11, 2016, the contents of which including the amendments have been incorporated into the electronics filing system (EFS-Web).

TECHNICAL FIELD OF THE INVENTION

The present invention relates to a communications satellite system's ground segment design and, in particular to the high-throughput-satellite (HTS) or multi-beam satellite system downlink signal-to-noise-plus-interference ratio (SNIR) and/or SNIR distribution performance prediction.

BACKGROUND OF THE INVENTION

The HTS system ground segment faces much intra-system interference caused by color reuse which includes frequency and polarization reuse among the spot beams. Specifically, the radiated powers of the satellite antennas for the spot beams of the same color interfere with each other downlink because of the imperfect satellite antenna radiation patterns that spread powers beyond the intended spot beam coverage areas. One of the system design objectives is to minimize this interference for the user terminals (UTs) of co-color spot beams or equivalently to maximize their SNIRs.

Because of the complexity and scale of an HTS system, simulations are often conducted to estimate the system quality of service (QoS) performance parameters which include the SNIRs and SNIR distributions of a design. To optimize a ground segment design, the downlink spot beam power spatial distribution is often estimated repeatedly to maximize the QoS SNIR distributions in system design simulations. It is thus desirous to have a simple spot beam power spatial distribution estimation method for downlink designs.

Moreover, when an HTS system in operation needs to reposition its beams or reassign frequency bands to its beams or both because of the changing traffic patterns or other considerations, SNIR distributions are estimated repeatedly in the partial redesign until optimal SNIR distributions are achieved. It is thus desirous to have a spot beam's SNIR and SNIR distribution estimation method as simple as possible to perform this task on the gateway (GW) such that it takes minimum amount of resources of the GW which often multi-tasks on data traffic, operational control, health monitoring and management of the system.

Therefore, a simple method for determining the HTS system downlink spot beam power spatial distribution is desirable for the repeated SNIR and SNIR distribution estimation in system ground segment designs off-line or during system operation.

BRIEF SUMMARY OF THE INVENTION

A method for estimation of a spot beam's power spatial distributions, and the SNIRs and/or SNIR distributions of an UT in an HTS system is provided. The method consists of steps used to estimate the parameters of an elliptical spot beam and those of multiple co-color spot beams, to derive the total co-color interference spot beam power spatial distribution with reference to the signal beam in the HTS system, and to obtain the SNIR and/or SNIR distribution of the UT in the signal spot beam of the HTS system. The estimation precision is controllable.

The power spatial distribution of all co-color spot beams minus signal beam forms the total interference power spatial distribution I on Earth by superimposition. It leads to the SNIR power spatial distribution or SNIR field. A stationary UT's SNIR or SNIR distribution depend on its position or position plus noise power distribution respectively in the SNIR field. A mobile UT's path SNIR distribution with changing positions in the SNIR field are obtained accordingly. The method improves over known method in the art provided in the information data sheet (IDS).

According to an embodiment of the present invention, a method for estimating spot beam power spatial distribution of an HTS system is provided. The method includes calculation of the semi-majors and semi-minors of a spot beam, calculation of the spot beam tilting angles, and projection of the inter-beam distances. The power spatial distributions of co-color spot beams in clear sky (CS) line-of-sight (LOS) satellite-to-Earth propagation channel conditions and the SNIR-s and/or SNIR distributions of an UT in a signal beam of the HTS system in CS LOS, rain and/or cloudy propagation channel conditions can be estimated accordingly.

The method is implemented in a programming language or programming languages running on general purpose computers or processors including desktops or laptops stand-alone for simple downlink designs. The method can be integrated into a simulation software package as a module to run on server(s) or super-computer(s) iteratively for an optimal HTS system ground segment design or into a system operation and management software package as a module in the control GW of the HTS system for a downlink partial optimal redesign during system operation.

Other features and advantages of the invention will be apparent in view of the following detailed description and preferred embodiments.

DETAILED DESCRIPTION OF THE INVENTION

Figure 1:
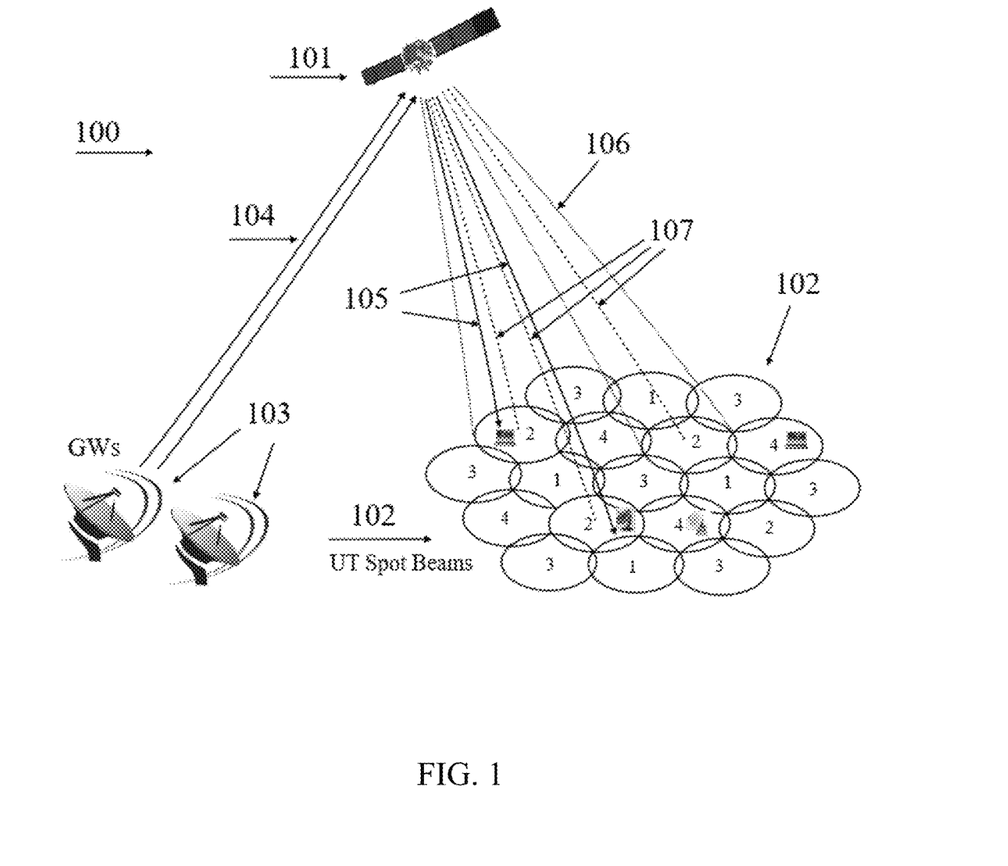
FIG. 1 is the architecture of a typical HTS or multi-beam system in which the present invention is applied to predict the downlink SNIR performance.

FIG. 1 illustrates a typical HTS or multi-beam system 100 where the space segment consists of a geostationary satellite 101 and the ground segment includes gateways 103 as feeder links 104 and user terminals (UTs) such as VSATs distributed among the spot beams 102 downlink 105 from the satellite to a UT in a forward link of a gateway-to-UT operation; rays 107 are satellite antenna radiation pattern nadirs that define the signal power peaks measured as 0 dB in the centers of the spot beams while rays 106 represent the satellite antenna radiation pattern n dB apertures that trace out the n dB power contours of the spot beams when they are illuminated by the satellite antennas' radiation power. According to the HTS system architectural elements' denotation convention, the n dB contours of three adjacent spot beams of equal-radius meet at the triple-cross point as illustrated in 106 of FIG. 1 and in FIG. 2, and it is uniquely set.

Figure 2:
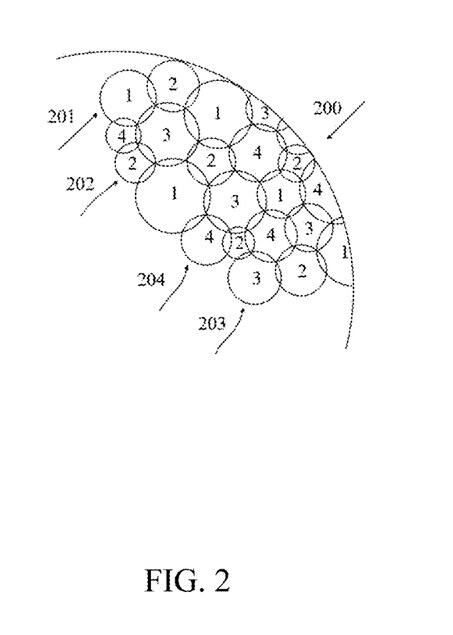
FIG. 2 illustrates color reuse typically employed among user spot beams downlink in an HTS system. The circles (ellipticals) are spot beam power contours that enclose the intended coverage areas illuminated by satellite antenna radiation pattern apertures.

FIG. 2 is a detailed sketch of color reuse among downlink spot beams 200 the present invention applies. Each elliptical (circle) represents the n dB power contour of a spot beam where the signal power is n dB down from the 0 dB power at the beam center. It corresponds to the satellite antenna radiation pattern n dB aperture rays 106 in FIG. 1 for the intended spot beam coverage area. Spot beams 201 are color 1 beams labeled 1. Spot beams 202 are color 2 beams labeled 2. So are spot beams 203 and 204. The 4 adjacent beams of different labels form a color reuse cluster. The 4 colors can be a combination of a frequency reuse 4 and a polarization reuse 1 or a combination of a frequency reuse 2 and a polarization reuse 2. In one scenario where multi-frequency time-division-multiple-access (MF-TDMA) is employed, when a UT in one of the 201 beams or the signal beam is receiving, the transmissions from the satellite intended for the other co-color 201 beams unintentionally received at this UT result in interferences to this receiving UT.

Figure 6:
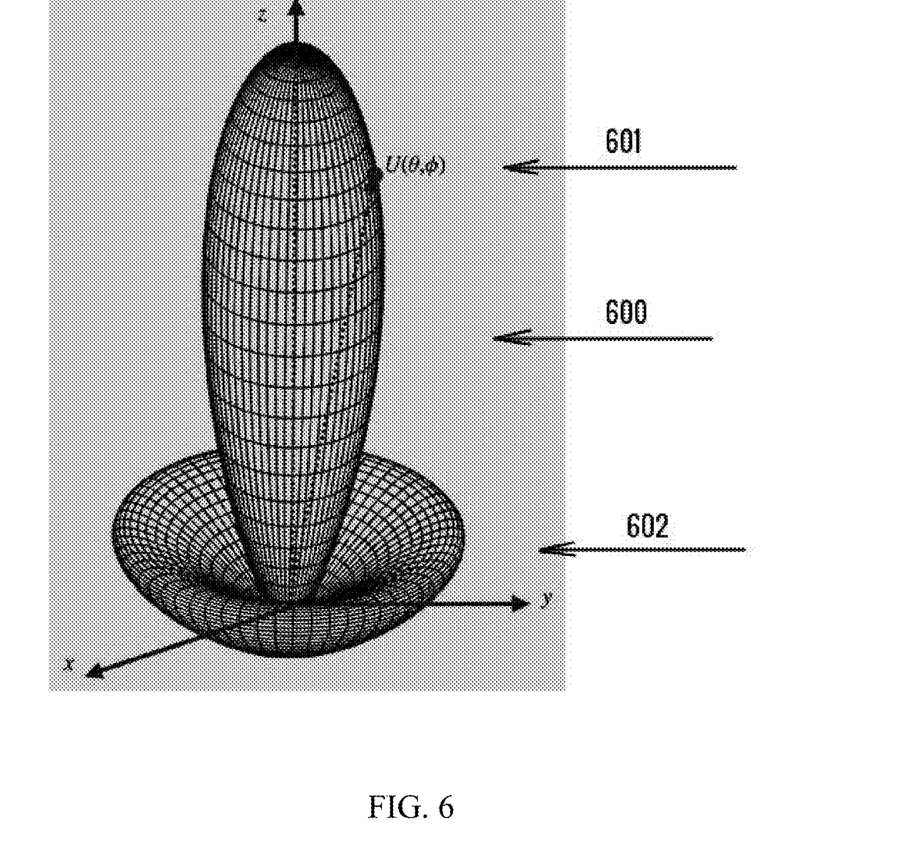
FIG. 6 illustrates a high-directional satellite antenna power radiation pattern of an HTS system in three dimensions.

An HTS system typically operates in Ka/Ku or higher frequency band because of the high-directional antenna radiation patterns achievable in these bands. FIG. 6 shows a directional antenna radiation pattern 600. It consists of a main lobe 601 and an illustrative side lobe 602. A real high-directional antenna radiation pattern has more than one side lobes. The radiation power strength $U(\theta, \emptyset)$ in FIG. 6 is a spherical representation where $\theta$ is the elevation angle in the cylindrical/spherical coordinate system with the origin at the power source that feeds the antenna and $\varphi$ the azimuth angle on the plane through the origin perpendicular to z-axis. In Ka/Ku-band, the satellite antenna radiation pattern is a function of the elevation angle only. Therefore, $U(\theta, \varphi)=U(\theta)$. It is obvious that a horizontal plane perpendicular to the z-axis of the main lobe 601 cuts a circle out of 600 and the circle diameter depends on $\theta$. By $U(\theta)$, the power on the circle is equal in strength. Let $\theta=\theta_0$, $\theta_0$ the angle where the plane makes its entry to 601 perpendicular to z-axis and cuts the circle out. The circle of 601 is the antenna radiation pattern aperture measured by $\theta_0$. It is set that $U(0)=0$ dB by normalization. If $U(\theta_0)=n$ dB, the circle by $\theta_0$ has a power n dB down from the peak at 0 dB. In Ka/Ku band, an aperture $\theta$ for an HTS system spot beam is typically within 2°.

The satellite antenna radiation pattern 600 of an HTS system forms a sub-satellite beam on Earth when projected straight down from satellite onto Equator. The beam is a circle centered at the projection of the power peak of 600 at a longitude determined by the geostationary satellite's position in orbit. When a Ka/Ku band antenna radiation pattern 600 in FIG. 6 is projected onto Earth elsewhere, its aperture by $\theta_0$ maps out an elliptic spot beam n dB power contour shown as 102 in FIG. 1 or as 201, 202, 203 or 204 in FIG. 2. The major 503 of the elliptical spot beam is in the beam tilting direction away from the sub-satellite longitude 502 by projection and the minor 504 is perpendicular to the major by definition of an ellipse illustrated in FIG. 5. These characteristics form the conditions for the construction of the present invention.

Figure 3:
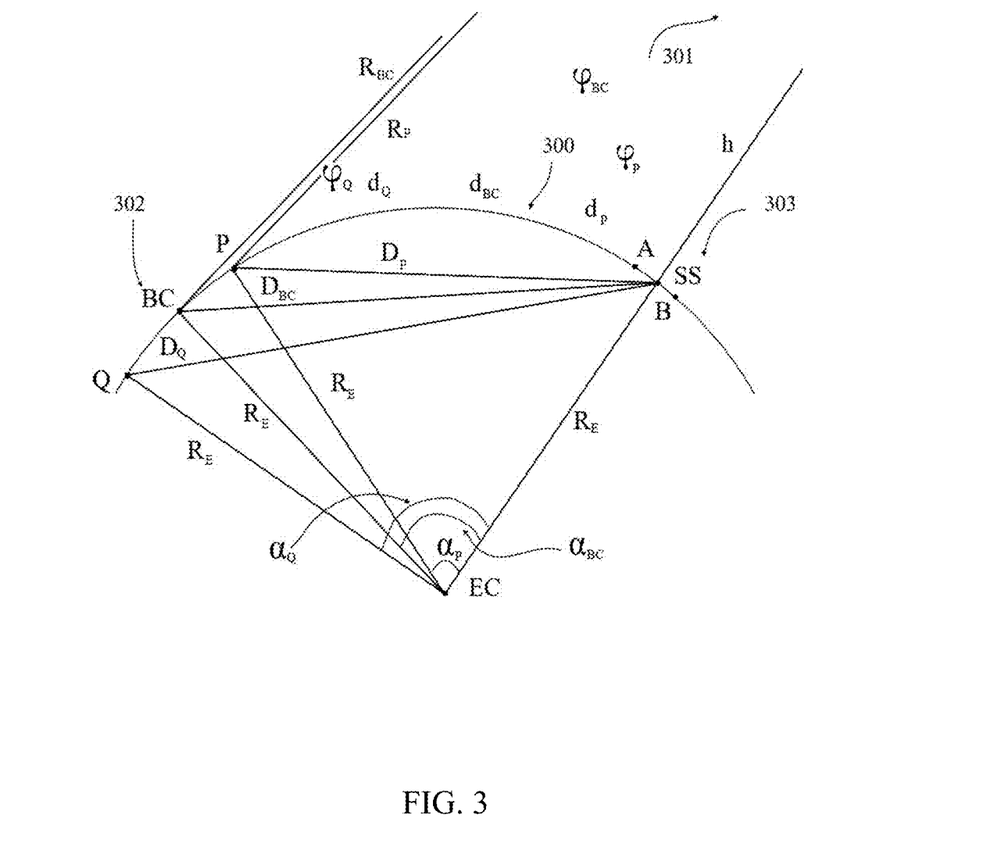
FIG. 3 illustrates the geometry by which the major including the inner semi-major and outer semi-major of a spot beam is calculated.
Figure 5:
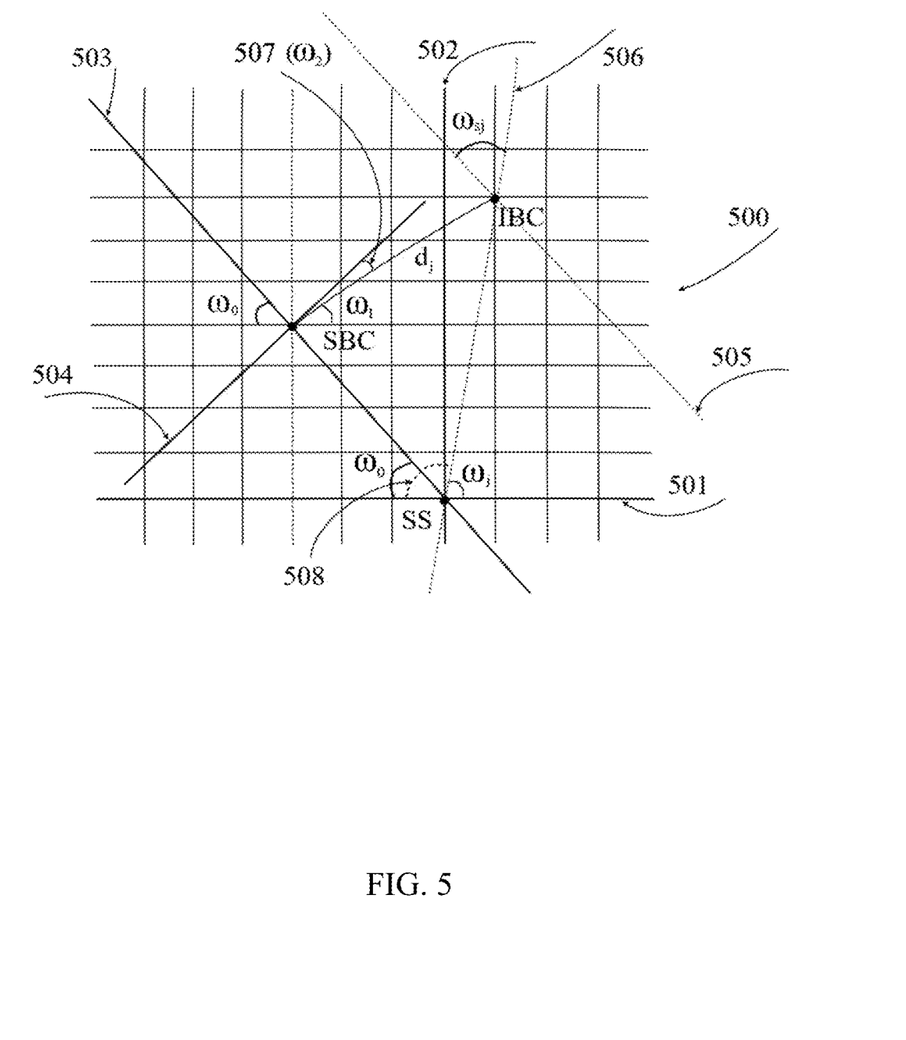
FIG. 5 illustrates the tilting angle calculation geometries for co-color spot beam power spatial distribution and a signal spot beam SNIR spatial distribution in the signal beam center centered Cartesian coordinate system (SBC-CCCS).

In FIG. 3, various points, angles and lines relevant to a spot beam major 15 calculation are labeled. The figure is not drawn to scale but serves to illustrate the steps used to calculate the major. EC stands for Earth center. Satellite 301 is not drawn but sits at the intersection of the altitude h and the spot beam slant path to satellite range $R_{BC}$. The satellite 301 position in the geostationary orbit determines the longitude of the center of the sub-satellite on Equator. It is where the satellite antenna radiation power peak (pattern nadir) of the main lobe 601 looks straight down on Equator. The spot beam center (BC) 302 and the center of the sub-satellite (SS) 303 are located on the arch of Earth surface or ground 300. The major of the spot beam is the line in the beam tilting direction that connects BC 302 and SS 303. The tilting direction is measured by the angle between the sub-satellite radius on longitude 502 and the major 503 of the spot beam. Arch $\overline{ASS}$ is the radius of the sub-satellite 303. $\overline{QBC}$ and $\overline{BCP}$ measure the two semi-majors of the spot beam 302 in the beam tilting direction. P denotes the spot beam inner semi-major point on the power contour from BC 302 while Q the spot beam outer semi-major point on power contour from BC 302 in the tilting direction.

$$\overline{QBC} \neq \overline{BCP}$$

In the first part of the elliptical spot beam major calculation, the arch distance $d_{BC}$ between BC and SS along Earth surface 300 is found by the Great Circle Distance formula[1] with given latitudes and longitudes of the BC and SS. Then by circumference of the Great Circle on Earth and $d_{BC}$, Earth center (EC) angle $\alpha_{BC}$ between BC and SS can be derived which leads to the solution of the straight-line distance $D_{BC}$ between BC and SS, and the spot beam slant path to satellite $R_{BC}$:

$$R_{BC}=\sqrt{R_E^2+(R_E+h)^2+2R_E(R_E+h)\cos(\alpha_{BC})} \qquad (1)$$

where $R_E$ is the radius of the Earth. With known $R_{BC}$, $R_E$ and $(R_E+h)$, the satellite antenna radiation pattern looking down angle $\varphi_{BC}$ away from sub-satellite (SS) 303 towards the signal beam center (BC) 302 for the spot beam is found by cosine law of triangles.

[1] https://en.wikipedia.org/wiki/Great-circle_distance

In the next part, because the two semi-majors of the spot is on the tilting direction of the spot beam, the satellite antenna radiation pattern looking down angle $\varphi_p$ away from the sub-satellite (SS) 303 towards the inner n dB beam edge point (P) on major for the spot becomes $$\varphi_P=\varphi_{BC}-\varphi_0 \qquad (2)$$

where $\varphi_0$ is the measure of the satellite antenna radiation pattern n dB aperture.

With known $\varphi_P$, $R_E$ and $(R_E+h)$, $R_P$, $D_P$ and $\alpha_P$ are found by law of cosine of triangles similar to Equation (1). The arch distance $d_P$ between sub-satellite (SS) 303 and the inner n dB semi-major spot beam 302 edge or contour point P in FIG. 3 is thus found by the known circumference of the Great Circle of Earth and $\alpha_P$. This leads to the inner semi-major:

$$\overline{BCP} = d_{BC} - d_P \quad (3)$$

Similarly, the outer semi-major $\overline{BCP}$ between the n dB spot beam edge point Q and the spot beam center (BC) 302 in FIG. 3 is found.

$$\overline{BCP} = d_Q - d_{BC} \quad (4)$$

Figure 4:
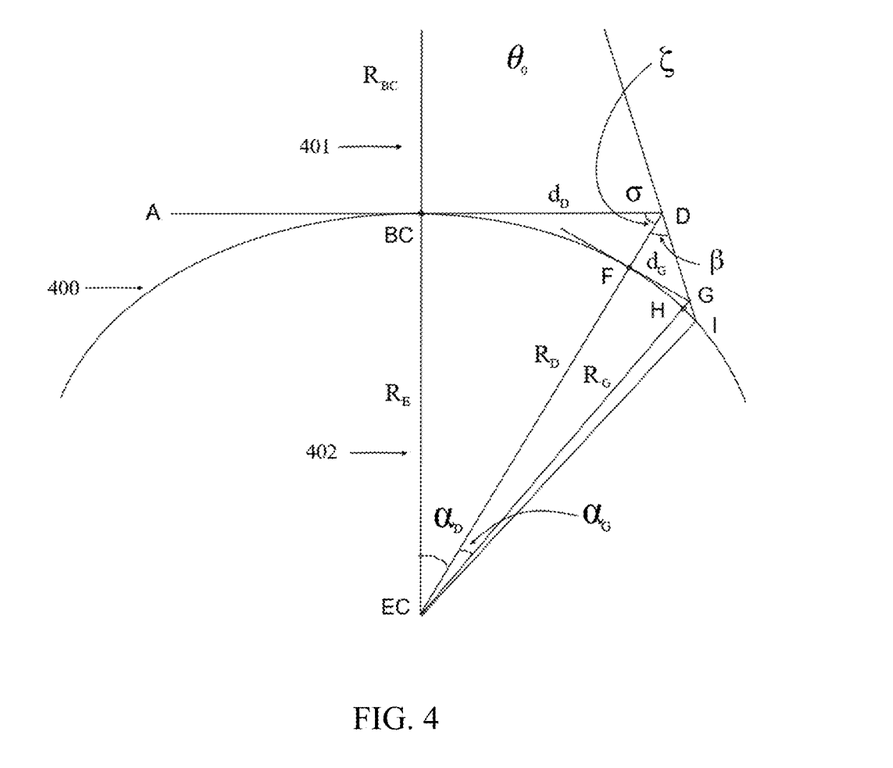
FIG. 4 illustrates the geometry by which the minor of a spot beam is approximated.

In FIG. 4, various points, angles and lines relevant to an elliptical spot beam minor estimation are labeled. The minor of the spot beam is perpendicular to its major and the two semi-minors are equal in length. Therefore, only one semi-minor is estimated. FIG. 4 is a continuation of FIG. 3. They share the slant path distance $R_{BC}$ 401 from the spot beam center (BC) 302 to satellite 301. The plane shown in FIG. 4 is perpendicular to that of FIG. 3 through $R_{BC}$ because the minor is perpendicular to the major. Auxiliary line AD is drawn tangent to Earth surface 400 at the spot beam center BC. The semi-minor shown in FIG. 4 is the arch distance $\overline{BCI}$ between the beam center BC and the n dB beam edge point I on Earth 400. This distance is approximated by recursions described below. Other auxiliary lines will be added at the recursions to aid in the semi-minor estimation.

In FIG. 4, distance $d_D$ between beam center (BC) and point D is found by $$d_D = R_{BC} \tan(\theta_0) \quad (5)$$

where point D is at the intersection of satellite 301 antenna radiation pattern n dB aperture ray to Earth and the tangent line AD. This leads to the finding of Earth center (EC) angle $\alpha_D$, the length of the line segment $\overline{ECD}$ between EC and point D and the arch distance $\overline{BCF}$ between point BC to point F on Earth surface 400. $\overline{FD}$ is found accordingly:

$$\overline{FD} = \overline{BCD} - R_E \quad (6)$$

Because angles σ and ζ are known in the right triangles of FIG. 4, angle β is obtained by $$\beta = \pi - \sigma - \zeta \quad (7)$$

Consequently, the distance $d_G$ between points F and G $$d_G = \overline{FD} \tan(\beta) \quad (8)$$

where line FG is tangent to Earth surface 400 at point F and meets the satellite antenna radiation pattern n dB aperture ray towards the spot beam minor edge at point G. This leads to the finding of $\alpha_G$ by $R_D$ and $d_G$ in the right triangle with vertices at F, EC, and G, the arch distance $\overline{FH}$ on 400 as well as the angle at vertex G bounded by line segments $\overline{FG}$ and $\overline{GEC}$. This process is repeated upon drawing another auxiliary tangent line at point H on 400 and other auxiliary tangent lines on 400 until a prescribed precision is reached. The semi-minor of the elliptic spot beam is then $$\widehat{BCI} = \widehat{BCF} + \widehat{FH} + \ldots \quad (9)$$

where $\widehat{BCI}$ estimation accuracy is controllable.

In FIG. 5, various points, angles and lines relevant to the calculation of a signal spot tilting angle and an interference spot tilting angle are labeled. The figure shows the angular and distance geometries among the sub-satellite spot beam, a signal spot beam and an interference spot beam in the sub-satellite center centered Cartesian coordinate system (SSCCCCS) and the signal spot beam center centered Cartesian coordinate system (SBCCCCS). It shows the Earth surface with latitudes and longitudes grid layout 500. The SSCCCCS has its origin at the SS center, its x-axis 501 on the equator and nits y-axis 502 on the radius of longitude of the SS center while the SBCCCCS has its origin at the signal spot beam center (BC), its y-axis on the signal spot beam major 503 and its x-axis on signal spot beam minor 504. The signal beam tilting angle $$\frac{\pi}{2} - |\omega_0|$$

is measured from the sub-satellite beam radius on longitude 502 to the signal beam major 503.

$$\frac{\pi}{2} - |\omega_0|$$

In one embodiment of the present invention, the tilting angle $\omega_{sj}$ of the jth interference beam can be calculated in reference to the SS 303 centered coordinates where the $(\sigma_{BC}, \lambda_{BC})$ is replaced with $(\sigma_{IBC}, \lambda_{IBC})$ in Equation (10). In the other embodiment of the present invention where the jth interference tilting angle $\omega_j$ is calculated with reference to the signal spot beam center BC 302 centered coordinates $(\sigma_{BC}, \lambda_{BC})$ is replaced by $(\sigma_{IBC}, \lambda_{IBC})$ while $(\sigma_{SS}, \lambda_{SS})$ is replaced by $(\sigma_{BC}, \lambda_{BC})$ in Equation (10). The $\omega_0$ and $\omega_j$ are calculated using Equation (10) accordingly.

With the availability of the semi-majors and the minor of a spot beam, a satellite antenna power radiation pattern in the HTS system denoted as $f_p(\theta)$ ($U(\theta)$ in 600 of FIG. 6) is laid over the spot beam to obtain the spot beam power spatial distribution $P_Z(x,y)$ in the SBCCCCS. This is formulated as follows:

$$\frac{\pi}{2} - |\omega_0|$$

where $\rho_y$ is the semi-major $\overline{BCP}$ or $\overline{QBC}$ normalized by the n dB radius of the sub-satellite beam, $\rho_x$ is the semi-minor $\overline{BCI}$ normalized by the same, and $P_{mr}$ is the satellite transmit power. Therefore, Equations (11a-d) render the spot beam power spatial distribution as a function of locations represented by (x,y) coordinates in the SBCCCCS with y-axis on major and x-axis on minor. The coordinates in (x, y) pairs can be converted into longitudes and latitudes of the same locations[2,3] respectively.

[2] https://gis.stackexchange.com/questions/142326/calculating-longitude-length-in-miles

[3] https://www.thoughtco.com/degree-of-latitude-and-longitude-distance-4070616

One preferred embodiment of the present invention is to estimate the channel SNIR for a stationary UT such as VSAT in the CS LOS, rain or cloudy propagation channel conditions. Since signal and interferes propagate through essentially the same slant path from the satellite to a stationary UT on Earth, the signal-to-interference ratio (SIR) of the UT is invariant at a fixed location regardless of the weather conditions which renders the SNIR a temporal distribution for the UT in the CS LOS, rain or cloudy channel conditions as a function of the noise temporal variation.

Let all the co-color interference beam center locations by latitudes and longitudes be known and each of their power spatial distributions be predicted by Equations (1-11), then the jth co-color interferer (CCI) power spatial distribution is given by $$P_{zj}(\theta) = P_{mrj}f_{jp}(\theta - \theta_j)\cos(\theta - \theta_j) \quad (12a)$$

$$= P_{mrj}f_{jp}(\operatorname{atan}((r_{xy} - r_j)/R_{BCj}))\cos(\operatorname{atan}((r_{xy} - r_j)/R_{BCj})) \quad (12b)$$

$$\cong P_{mrj}f_{jp}\left(\frac{\sqrt[2]{(\rho_x(x-x_j))^2 + (\rho_y(y-y_j))^2}}{R_{BCj}}\right) \quad (12c)$$

$$\cos\left(\frac{\sqrt[2]{(\rho_x(x-x_j))^2 + (\rho_y(y-y_j))^2}}{R_{BCj}}\right)$$

$$= P_{zj}(x, y) \quad (12d)$$

where $(x_j, y_j)$ is the center of the jth interference spot beam which is computed by the following two steps:
1. Calculate the distances $d_j$ between the signal beam center (SBC) and the center of the jth CCI (IBC) of FIG. 5 via Great Circle distance[1]
2. Obtain the projection of $d_j$ onto the x-axis and y-axis in SBCCCCS: (SBC, 504, 503) by $$x_j = d_j\cos(\omega_2) \quad (13a)$$

$$y_j = d_j\sin(\omega_2) \quad (13b)$$

where $\omega_t$ or 507 shown in FIG. 5 is the angle between $d_j$ and the minor 504 (x-axis) of the SBCCCCS (SBC, 504, 503).

To position the jth co-color spot beam in reference to the signal spot beam, the tilting angle $\omega_{sj}$ of the interference spot beam measured from the major of the interference spot beam (506, IBC) to the major of the signal spot beam (503, SBC) in the SBCCCCS (SBC, 503, 504) is calculated by drawing the auxiliary line 505 parallel of major 503, then $$\omega_{sj} = \pi - \omega_0 - \omega_j \text{ or} \quad (14a)$$

$$\omega_{sj} = |\omega_0 - \omega_j| \quad (14b)$$

The major and minor of the interference spot beam (IBC, 506) are computed by Equations (1-9). Therefore, in the SBCCCCS (SBC, 503, 504) by Equations (11-12), the SNIR is a three dimensional distribution dependent on locations spatially and on time with noise N variation $$SNIR(x, y, N) = \frac{P_Z(x, y)}{N + \sum_{j=1}^{k} P_{zj}(x, y)} \quad (15)$$

for a total k interferers; where noise N is the UT receiver noise in CS LOS channel conditions primarily and UT receiver noise plus the atmospheric noise in precipitation of rain or/and clouds channel conditions. N is additive white Gaussian for both conditions as a random variable. Therefore, the SNIR temporal distribution at a given location $(x_1, y_1)$ is $$f_{SNIR(x_1, y_1, N)}(\zeta) = \left(\frac{P_z(x_1, y_1)}{\zeta^2}\right)\left(\frac{1}{\sqrt{2\pi n_0}}\right)e^{-\frac{\left(\frac{P_z(x_1,y_1)}{\zeta} - \sum_{j=1}^{k} P_{zj}(x_1,y_1)\right)^2}{2n_0}} \quad (16)$$

where $n_0$ is the total noise power density.

Another preferred embodiment of the present invention relates to the estimation of the path SNIR distribution of a mobile UT in the CS LOS, rain or/and cloudy propagation channel conditions by $$SNIR_{mp}(x,y,N) = SNIR(x,y,N)@(f(x,y)\&g(N)) \quad (17)$$

where f(x, y) defines the mobile path and $SNIR_m$ samples the SNIR field along the mobile path. In addition, the instantaneous SNIR variation rate of a mobile UT can be estimated by $$\frac{d(SNIR)}{dt} = \frac{\partial(SNIR)}{\partial x}\frac{\partial x}{\partial t} + \frac{\partial(SNIR)}{\partial y}\frac{\partial y}{\partial t} + \frac{\partial(SNIR)}{\partial N}\frac{\partial N}{\partial t} \quad (18a)$$

$$= \frac{\partial(SNIR)}{\partial x}v_x + \frac{\partial(SNIR)}{\partial y}v_y + \frac{\partial(SNIR)}{\partial N}\frac{\partial N}{\partial t} \quad (18b)$$

where $$V_x = C(x, y)\cos(\varphi) \quad (19)$$

$$V_y = C(x, y)\sin(\varphi) \quad (20)$$

$$v_x^2 + v_y^2 = C^2(x, y) \quad (21)$$

$$\tan(\varphi) = \frac{dy}{dx} = \frac{\partial f(x, y)/\partial x}{\partial f(x, y)/\partial y} \quad (22)$$

and C(x, y) is the mobile's instantaneous velocity.

What is claimed is:

1. A method used to determine the signal-to-noise-plus-interference ratio (SNIR) and SNIR distribution performance of a user terminal (UT) in a communications high-throughput-satellite (HTS) system wherein the HTS system includes a geostationary satellite, at least one gateway (GW) and a plurality of user terminals (UTs) distributed in a color reused spot beam coverage area illuminated by the satellite high-directional antenna power radiation patterns, the method comprising:

determining a spot beam power spatial distribution in the sub-satellite center centered Cartesian coordinate system (SSCCCCS) with x-axis on Equator and y-axis on the radius of longitude in clear-sky (CS) line-of-sight (LOS) propagation channel conditions by matching the two n dB aperture points of a satellite antenna power radiation pattern for the spot beam in the beam tilting direction to the two n dB semi-major end points on the spot beam's n dB power contour, matching the two n dB aperture points of the same in the direction perpendicular to the beam tilting direction with the spot beam's two n dB semi-minor end points and laying the rest of the satellite antenna power radiation pattern over the spot beam;

determining the total co-color interference power spatial distribution I of an UT's SNIR as a function of the UT's position on Earth in the Cartesian coordinate system centered at the center of a signal spot beam where the UT resides in CS LOS propagation channel conditions through a transformation of the total co-color interference spot beam power spatial distribution representation in the SSCCCCS to the same in the signal beam center centered Cartesian coordinate system (SBC-CCCS) accomplished by rotating all the co-color interference spot beams with respect to the signal spot beam measured from the major of the signal spot beam to the majors of the co-color interference spot beams, and projecting the inter-beam distances between the signal spot beam center and the centers of the co-color interference spot beams onto the axes of the SBCCCCS as the coordinates of the interference beam centers in the SBCCCCS;

determining the stationary UT's SNIR or SNIR instantaneous distribution in CS LOS, rain or cloudy propagation channel conditions wherein the SNIR or SNIR distribution does not count or does count the noise power variation in time respectively; and determining the mobile UT's path SNIR spatial distribution or path SNIR instantaneous distribution and variation rate in CS LOS, rain or cloudy propagation channel conditions wherein the SNIR does not count or counts the noise power variation in time respectively.

2. The method of claim 1 further comprising:

estimating the n dB minor of an elliptical spot beam for the geostationary satellite's position in orbit, the spot beam center, and the satellite antenna power radiation pattern;

calculating the n dB spot beam major including the inner semi-major and outer semi-major in the beam tilting direction for the satellite's position in orbit, the spot beam center, and the satellite antenna power radiation pattern; and determining the tilting direction of the elliptical spot beam with respect to the sub-satellite spot beam measured from the sub-satellite's radius on longitude to the major of the elliptical spot beam in the SSCCCCS.

* * * * *

UNITED STATES PATENT AND TRADEMARK OFFICE
CERTIFICATE OF CORRECTION

PATENT NO. : 10,797,786 B1
APPLICATION NO. : 16/447898
DATED : October 6, 2020
INVENTOR(S) : Liping Ai It is certified that error appears in the above-identified patent and that said Letters Patent is hereby corrected as shown below:

In the Specification

Column 2 Lines 21 through 31:
There should be no indent

Column 4 Line 56:
Footnote 1 should be moved to the bottom of Column 4, Line 68

Column 5 Line 11: $\overline{BCP} = d_Q - d_{BC}$  (4)
Should read: $\overline{QBC} = d_Q - d_{BC}$  (4)

Column 6 Lines 16 through 19: $\frac{\pi}{2} - |\omega_0|$
Should read: $\omega_0 = \tan((\sigma_{BC} - \sigma_{SS})/(\lambda_{BC} - \lambda_{SS}))$  (10)

Column 6 Lines 35 through 40: $\frac{\pi}{2} - |\omega_0|$

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,797,786 B1

$$P_z(\theta) = P_{mr}f_\rho(\theta)\cos(\theta) = P_{mr}f_\rho\left(\text{atan}\left(^{T_{xy}}/_{R_{BC}}\right)\right)\cos(\theta) \quad (11a)$$

$$= P_{mr}f_\rho\left(\text{atan}\left(\frac{\sqrt{(\rho_x x)^2+(\rho_y y)^2}}{R_{BC}}\right)\right)\cos(\theta) \quad (11b)$$

$$\cong P_{mr}f_\rho\left(\frac{\sqrt{(\rho_x x)^2+(\rho_y y)^2}}{R_{BC}}\right)\cos(\theta) \quad (11c)$$

$$= P_z(x,y) \quad (11d)$$

Should read:

Column 6 Lines 50 through 52:
Footnotes 2 and 3 should be moved to the bottom of Column 6, Line 68